United States Patent
Mitsch et al.

(10) Patent No.: US 11,255,409 B2
(45) Date of Patent: Feb. 22, 2022

(54) ROTATING VIBRATION ABSORBER COMPRISING A BELT DRIVE

(71) Applicant: ESM ENERGIE-UND SCHWINGUNGSTECHNIK MITSCH GMBH, Heppenheim (DE)

(72) Inventors: Franz Mitsch, Heppenheim (DE); Florian Fritz, Rimbach (DE)

(73) Assignee: ESM ENERGIE-UND SCHWINGUNGSTECHNIK MITSCH GMBH, Heppenheim (DE)

( * ) Notice: Subject to any disclaimer, the term of this patent is extended or adjusted under 35 U.S.C. 154(b) by 0 days.

(21) Appl. No.: 16/964,076

(22) PCT Filed: Feb. 4, 2019

(86) PCT No.: PCT/EP2019/000032
§ 371 (c)(1),
(2) Date: Jul. 22, 2020

(87) PCT Pub. No.: WO2019/154557
PCT Pub. Date: Aug. 15, 2019

(65) Prior Publication Data
US 2021/0048088 A1 Feb. 18, 2021

(30) Foreign Application Priority Data
Feb. 8, 2018 (EP) .................... 18000115

(51) Int. Cl.
*F16F 15/31* (2006.01)
*F03D 80/00* (2016.01)
(Continued)

(52) U.S. Cl.
CPC ........... *F16F 15/31* (2013.01); *E04H 9/0215* (2020.05); *F03D 80/00* (2016.05); *F16F 7/10* (2013.01);
(Continued)

(58) Field of Classification Search
CPC . F16F 7/10; F16F 7/1022; F16F 15/18; F03D 80/00; E04H 9/0215; F05B 2260/964
See application file for complete search history.

(56) References Cited

U.S. PATENT DOCUMENTS 6,164,022 A * 12/2000 Ishikawa .................. B23Q 1/48
52/167.1
10,711,859 B2    7/2020 Mitsch
(Continued)

FOREIGN PATENT DOCUMENTS

EP    0 722 870 A1    7/1996
EP    1 008 747 A2    6/2000
(Continued)

OTHER PUBLICATIONS

International Search Report Corresponding to PCT/EP2019/000032 dated Apr. 11, 2019.
(Continued)

*Primary Examiner* — Vishal R Sahni
(74) *Attorney, Agent, or Firm* — Michael J. Bujold; Jay S. Franklin

(57) ABSTRACT

A vibration absorber which, in addition to a main mass which is fixed thereto and moved along a curved trajectory by a driving mechanism, comprises a substantially smaller variably adjustable rotating flywheel mass which is moved together with the main mass along the trajectory thereof, enabling the adjustment of the frequency of the absorber. The rotating flywheel mass is driven by a novel belt device independently of the driving mechanism. A rotating vibration absorber which, along with the main mass and the rotating flywheel mass, comprises its own damping unit, such as an eddy-current damping unit.

16 Claims, 3 Drawing Sheets

(51) Int. Cl.
*E04H 9/02* (2006.01)
*F16F 15/18* (2006.01)
*F16F 7/10* (2006.01)
*F03D 13/20* (2016.01)

(52) U.S. Cl.
CPC ............ *F16F 7/1022* (2013.01); *F16F 15/18* (2013.01); *F03D 13/20* (2016.05); *F05B 2260/964* (2013.01); *Y02B 10/30* (2013.01)

(56) References Cited

U.S. PATENT DOCUMENTS

2018/0252287 A1* 9/2018 Mitsch ................. F16F 7/10
2019/0024535 A1* 1/2019 Mitsch ................. H02K 49/046

FOREIGN PATENT DOCUMENTS

| EP | 2 746 483 A1 | 6/2014 |
| JP | H02-33947 U | 3/1990 |
| JP | 08-200438 A | 8/1996 |
| WO | 2009/068599 A2 | 6/2009 |
| WO | 2012/121694 A1 | 9/2012 |
| WO | 2017/036581 A1 | 3/2017 |

OTHER PUBLICATIONS

Written Opinion Corresponding to PCT/EP2019/000032 dated Apr. 11, 2019.

* cited by examiner

Fig. 1
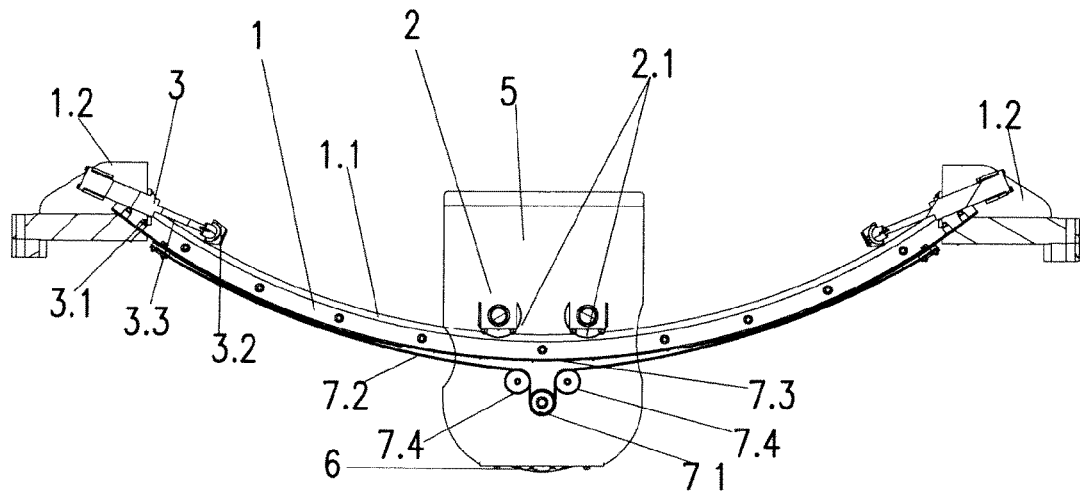
Fig. 2A
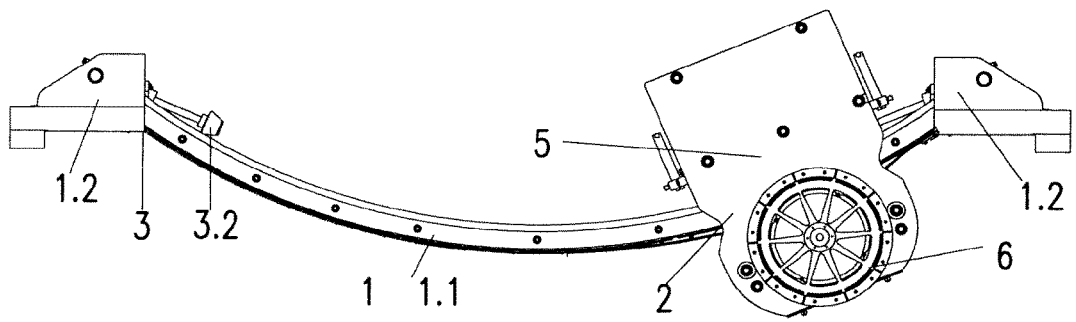
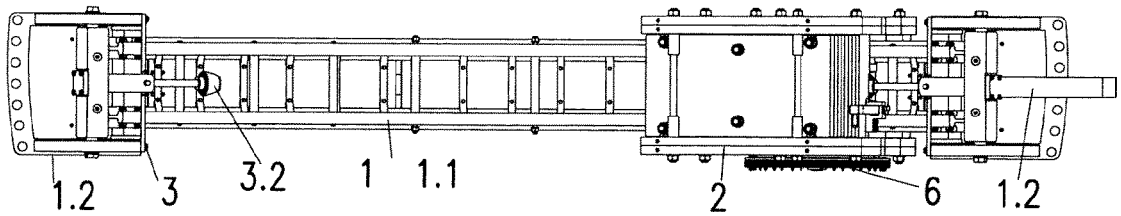
Fig. 2B

ROTATING VIBRATION ABSORBER COMPRISING A BELT DRIVE

This application is a National Stage completion of PCT/EP2019/000032 filed Feb. 4, 2019, which claims priority from European patent application serial no. 1800115.8 filed Feb. 8, 2018.

FIELD OF THE INVENTION

The invention relates to a vibration absorber for damping vibrations, such as can occur, for example, in wind turbines or other tall, slender buildings or systems.

The invention relates in particular to a vibration absorber which, in addition to a main mass which is fixed thereto and moved along a curved trajectory by means of a driving mechanism, similarly to the movement of a pendulum, comprises a substantially smaller variably adjustable rotating flywheel mass which is moved together with the main mass along the trajectory thereof, allowing the precise adjustment and/or adaptation of the frequency of the absorber.

The invention relates in particular to a corresponding rotating vibration absorber, in which the rotating flywheel mass is driven independently of the driving mechanism by means of a novel belt device.

The invention further relates to such rotating vibration absorbers which, in addition to the damping by the rotating flywheel mass, have a further damping unit, such as an eddy-current damping unit.

BACKGROUND OF THE INVENTION

Tall and slim buildings and systems are subject to special vibration conditions, which must be taken into account by technical measures so that no damage or premature fatigue processes occur. This applies in particular to wind turbines, which, due to their rapid technical development, have increasingly been used in more extreme areas (e.g., offshore) and heights in recent years, and also have ever higher towers to take advantage of the better wind conditions there. Such wind turbines must withstand the forces that arise due to wind, waves, weather and operation, which act with different loads at different points on the turbines. Vibration forces, in particular, can jeopardize the operation and safety of the systems. It is therefore necessary to specifically and effectively dampen the vibrations, occurring in these systems using technical measures. This is done with vibration absorbers or vibration dampers of different designs in accordance with the various, different fields of application.

Pendulum absorbers for wind turbines are described, for example, in EP 1008747 (B1) or in WO 2009/068599. Classic pendulums are used here, but due to the small amount of space available in the tower, they can only cover small oscillation paths, which means that the required absorber masses have to be quite large in order to be able to influence the corresponding natural frequency.

From JP 08-200438 (A), a vibration absorber is known which comprises an absorber mass, which is equipped with rollers and can roll back and forth thereon on a concave curved circular rail arrangement, wherein the mass moves de facto like the mass of one virtual pendulum having a pendulum rod or rope corresponding to the radius of the circle. While the rough setting for the natural frequency is determined by the rough configuration of the system (mass, rail dimensions, length, etc.), the natural frequency can only be fine-tuned in this system by changing the curvature of the rail, which should be technically very complex, and is not possible in some cases.

EP 2746483 (A1) presents a roller absorber for a wind power plant, which is also based on a pendulum movement, in which a possibly variable absorber mass can be displaced on a wheel-rail arrangement from a central position using restoring forces, in particular spring forces. The absorber mass-rail arrangement is arranged within a surrounding frame, wherein the height adjustment provided in this frame ensures the desired fine tuning of the frequency, since the height adjustment physically causes a change in the length of the virtual pendulum.

WO 2017/036581 proposes a vibration absorber developed especially for wind turbines, which has a running or driving gear, a main absorber mass and a running device, wherein the main absorber mass is attached to the running gear or is an integral part thereof, and the running device is concave or is curved in a circle, and the running gear or the main absorber mass on the running device can be moved out of a central position or apex position by means of wheels or rollers in accordance with the vibrational forces which trigger the movements and act in the direction of the running device. The running gear or driving gear or the main absorber mass has a disc-shaped, rotationally symmetrical, possibly variably adjustable flywheel mass, which only makes up a fraction of the main mass of the vibration absorber, has an axis of rotation perpendicular to the plane of the curved trajectory of the running device, and together is moved with the main absorber mass on the running device on wheels or rollers. The rotating flywheel mass is driven by at least one drive wheel, which moves on the rail running device together with the other guide wheels. The basic idea of this absorber is to make possible small masses through large oscillation paths. While vibration absorbers in previous towers achieve vibration paths of only 300-500 mm, oscillation paths of more than 3000-5000 mm can be realized with the described absorber. This means that the required mass can be reduced to about $\frac{1}{10}$ with an oscillation travel of about 10 times, which is an advantage per se.

The forces to be applied during the movement of the rotating flywheel mass are transmitted to the running device (rails or pipes) by friction of the rollers or wheels, and thus also to the drive wheel or the drive wheels. As a result, it can happen, in particular in the case of moist, oily, or icy running devices or icy, moist, or oily wheels or rollers, that in particular the drive wheel of the rotating flywheel mass rotates or slips on the running device, which has a negative effect on the desired damping effect. In order to counter this problem, WO 2017/036581 therefore proposes, among other things, to coat the drive wheel(s) with a material with a high coefficient of friction or to equip the running surface of the rails and the wheels with a tooth profile.

It has now been shown that even the use of such or similar materials and profiles on the running device and wheels in heavy wetness or significant ice accumulation is not sufficient to drive the flywheel having the magnetic damper with sufficient torque. In addition, it was found that the use of the measures mentioned is not only susceptible to wear under normal conditions but can also lead to more difficult fine-tuning of the desired or necessary natural frequencies.

The task was therefore to improve the rotating vibration absorber proposed in WO 2017/036581, which is very effective, particularly under normal weather conditions, in such a way that the disadvantages described, in particular under wet conditions and with ice formation, no longer occur.

SUMMARY OF THE INVENTION

The object was achieved in that the at least one drive wheel of the rotating flywheel mass from WO 2017/036581 is driven independently of the other guide wheels or guide rollers of the running device moving on the running gear.

The invention thus relates to a vibration absorber which can be variably adapted to an interference frequency, which can be used in wind turbines, buildings, machines in systems having comparable vibration characteristics, comprising a running gear (2) equipped with running rollers (2.1), a main absorber mass (5) and a running device (1), wherein (i) the main absorber mass (5) is attached to the running gear or is an integral part of the running gear, (ii) the running device (1) for the running gear (2) is substantially circular or concave in such a way that the running gear or the main absorber mass (5) can be moved and displaced on this running device from a central position or apex position in accordance with the vibrational forces which trigger the movements acting in the direction of the running device, (iii) the running gear (2) or the main absorber mass (5) has at least one disc-shaped, rotationally symmetrical driven rotating flywheel mass (6) having an axis of rotation perpendicular to the plane of the circular path of the running device, and moves together with the main absorber mass (5), and (iv) the at least one rotating flywheel mass (6) comprises at least one rotating mass disc and has a direction of rotation which substantially corresponds to the respective direction of the moving running gear along the running device, wherein the disc-shaped rotating flywheel mass (6) is driven by a belt drive device (7) without noteworthy effective involvement of the running rollers (2.1) of the running gear (2), the belt drive device is attached underneath the running device (1), and the center of gravity of the rotating flywheel mass (6) which is connected to the belt drive device is below the running device (1).

According to the invention, the at least one drive wheel of the rotating flywheel mass of the vibration absorber no longer moves on a running rail but on a running belt below the curved running device or the curved running rails. The positioning of the center of gravity of the rotating flywheel mass below the running device is substantial for the found advantageous properties of the vibration absorber according to the invention.

Surprisingly, it was found that the damping properties, including fine tuning of the frequencies of the absorber, are excellent when using such a belt drive even in difficult weather conditions (wet, ice) and are not inferior to those under normal operating conditions of the vibration absorber. In addition, the belt drive according to the invention is surprisingly far less susceptible to wear than the toothed belt solution for the running rails and the wheels described in WO 2017/036581.

Without wishing to be bound by theory, it is assumed that not only the decoupling of the drive of the rotating flywheel mass from the drive of the running and guide wheels on the running rails has an advantageous effect on the properties mentioned, but also the fact that the focus of the rotational mass and thus the total mass of the running gear (including the main mass of the absorber) is lower compared to the running device. The center of gravity of the rotating mass in the belt drive according to the invention described here is therefore below the running rails in contrast to WO 2017/036581.

The belt drive device (7) comprises a tensioned running belt (7.2), at least one drive wheel (7.1) and a belt support (7.3), which substantially has the curvature of the running device (1) and is attached underneath it over its entire length. The rotating flywheel mass (6) is driven by the drive wheel (7.1), which moves back and forth on the running belt (7.2) below the belt support (7.3), in accordance with the movement of the running gear (2) that is accomplished via the running rollers (2.1) on the running device (1).

In a preferred embodiment of the invention, in the operating state, the tensioned and possibly individually tensionable running belt (7.2) is guided such that it substantially follows the curved shape of the belt support (7.3) in front of and behind the drive wheel (7.1) and largely rests on the belt support and is attached at its ends thereto with the exception of the area of the drive wheel (7.1). The belt support (7.3) can be attached to the running device, for example, but it can also be an integral part of the same.

In a further embodiment of the invention, the rotating vibration absorber has a running device (1) which comprises at least one curved running rail (1.1) on which the at least one running wheel (2.1) of the running gear (2) moves in accordance with the acting vibration forces, wherein the at least one running rail (1.1) has at its two ends a stop device (1.2) which preferably interacts with a conical, elastic bearing (3.4) attached on or in the running gear (2) as soon as it reaches the area of the stop device of the running rail. In one embodiment of the invention, the stop device (1.2) comprises a hydraulic brake cylinder (3) which has an elastic brake cone (3.2) which engages in the running gear (1) as soon as the running gear reaches the stop area. Furthermore, said stop device can have at least one joint (3.1), so that the brake cylinder can follow the change in angle (3a, 3b) of the running gear when moving on the curved trajectory.

In a special embodiment of the invention, the rotating vibration absorber according to the invention comprises at least one additional device for damping vibrations, for example an eddy-current damper (8), which is preferably housed and effective in the component of the rotating flywheel mass (6).

A suitable eddy-current damper is described in detail, for example in WO 2017/036581, as part of the rotating flywheel mass. The eddy-current damper (8) comprises a magnet arrangement (8.1) consisting of permanent magnets and an electrical conductor disc (8.2), the conductor disc and the magnet arrangement lying opposite one another and being separated from one another by an air gap (8.3) and being arranged and fastened in such a way that they can be moved relative to one another by means of a rotation of the rotating flywheel mass (6). In this case, the co-rotating magnet arrangement (8.1) can be arranged on the circumference of the rotating flywheel or the flywheel mass (6) and the non-rotating conductor disc (8.2) can be attached between the opposite magnet arrangement (8.1) and the rotating flywheel mass (6), or the co-rotating electrical conductor disc (8.2) can be arranged on the circumference of the disc-shaped rotating flywheel mass (6) or is itself the conductor disc, and the opposite magnet arrangement (8.1) can be arranged on a non-co-rotating plate (8.4) which is located between the co-rotating conductor disc and the rotating flywheel mass.

The rotating vibration absorber according to the invention is provided in particular for damping vibrations of structures or machine systems having a natural frequency of <10 Hertz, preferably <5 Hz, in particular <1 Hz, as can occur in particular in wind turbines or other tall, slim buildings or systems.

BRIEF DESCRIPTION OF THE DRAWINGS

The reference values in the figures and in the text as well as the drawings themselves are explained in more detail below.

FIG. 1 shows a section in which the steering unit (7.4) with the drive wheel (7.1) is shown. The rotating flywheel mass (6) lies behind the view shown.

FIG. 2A shows the rotating vibration absorber according to the invention from the side with a view of the rotating flywheel mass (6), the running gear plus absorber masses being located at the right stop point (1.2) of the running device (1).

FIG. 2B shows the same vibration absorber from above.

FIG. 4B is an enlargement of an area of FIG. 4A.

DETAILED DESCRIPTION OF THE PREFERRED EMBODIMENTS

Figure 3:
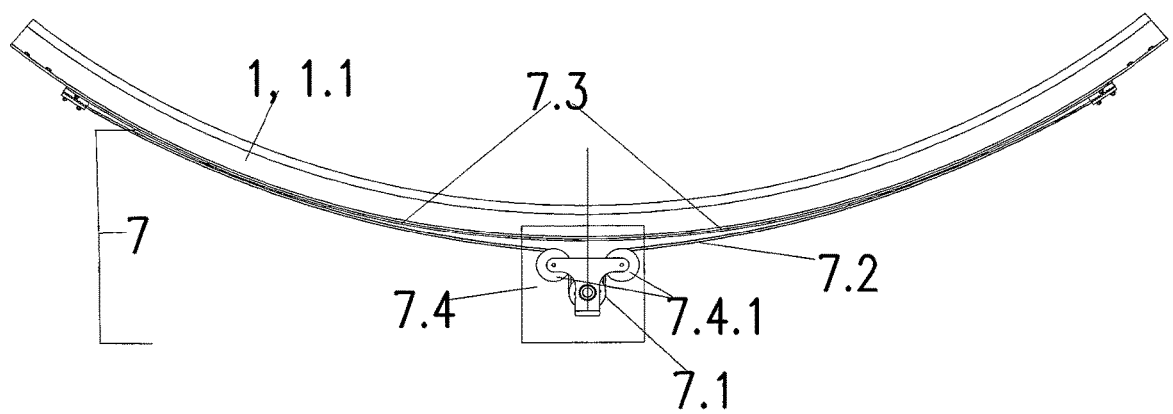
FIG. 3 shows a special deflection unit having a tensioning device (running gear with a rotating flywheel mass and main absorber mass are omitted here).

The principle of the rotating vibration absorber on which this invention is based has already been described in detail in WO 2017/036581.

A rotating mass stores kinetic energy that is proportional to the moment of inertia of the rotating mass. The natural frequency can be changed and adjusted by changing the amount of the rotating mass. The frequency is reduced by adding mass to the rotating disc. In contrast to this, the frequency change is effected by changing the main mass in the known pendulum absorbers.

In classic vibration absorbers, in particular pendulum absorbers, which are used in towers or high buildings, vibration paths of only about 300-500 mm can be achieved, since otherwise the necessary absorber mass would have to be chosen excessively large, which ultimately leads to undesirable properties.

By using a roller absorber like the ones presented here, oscillation paths of more than 3000-5000 mm can be realized. This means that the required mass can be reduced to about ⅒ with an oscillation travel of about 10 times, which is an advantage per se. The rotating flywheel mass has a possibly changeable rotating mass which, depending on the diameter of the rotating mass or the diameter of the center of mass of the mass part, corresponds to 1%-30% of the main absorber mass (5). By using such an absorber, it is possible according to the invention to change the frequency of the natural vibration by up to 30%, preferably up to 20%, in particular up to 10 or 15%, depending on the selected rotational mass or moment of inertia as well as other structural properties of this rotating mass.

The rotating vibration absorbers described here are extremely suitable for damping vibrations below 10 Hz, in particular below 5 Hz, 1 Hz, up to about 0.5 Hz, preferably between 1 Hz and 0.25 Hz. The frequency can be changed by about 10-35%, in particular by about 20-30%, whereby the frequency can be set very precisely and in small steps. Only small masses are required, which amount to approximately 1/20 to ¼, preferably approximately 1/10 of the vibrating main mass, which is a clear advantage over comparable classic vibration absorbers without a rotating flywheel mass. Thus, in the roller absorber according to the invention, for example with a running device of 2.5 m to 3.5 m in length for the moving masses, the frequency of a vibrating main mass of, for example, 250 kg having a rotational mass of approximately 65 kg and a diameter of 0.25 m can be changed by 20-30%. In the case of a diameter of the rotating mass of, for example, 0.5 m, only a rotating mass of around 15 kg is necessary for the same effect, and in the case of a diameter of 0.75 m, a rotating mass of about 7 kg is necessary.

The novel rotating vibration absorbers according to the present invention, which are based on the relevant absorbers of WO 2017/036581, are shown in FIGS. 1 to 4.

The rotating flywheel mass (6) generally comprises a flywheel (for example made of lighter material such as plastics material or aluminum) which has a central shaft or axis which is connected to the drive wheel (7.1). The axis or shaft of the flywheel and thus the rotating mass is aligned such that the plane of the wheel is largely parallel to the other running wheels (2.1) on the running device (1), so that in the optimal case the direction of rotation of the rotating mass corresponds to the direction of the running device and thus corresponds to the direction of the running gear.

In contrast to WO 2017/036581, as shown in FIG. 1, at least one drive wheel (7.1) is not part of the running wheels of the running gear and therefore does not run on the actual curved running device (1) or its rail or rails (1.1), but moves and rotates separately—triggered by vibration-related movement of the running gear (2) of the system (for example, a wind power plant)—on a separate belt drive device (7) below the curved running device (1). According to the invention, the drive of the running gear (2) (2.1) on the running device (1) (1.1) is decoupled from the drive (7.1) of the rotating flywheel mass.

While the running gear (2) with its running rollers (2.1) together with the main mass (5) of the absorber attached thereto can move back and forth on the running device, the rotating flywheel mass is driven independently of the drive wheel (7.1) of the belt device (7).

The drive wheel (7.1) rotates about a shaft which is connected to the rotating flywheel mass (6) or the main absorber mass (5) and which is mounted on the running gear (2) or the main mass. As a result, the rotating flywheel mass moves along the belt drive device (7) together with the running gear (2) along the curved running device (1), wherein the belt drive device is attached below and along the curved running device along its length.

This creates an additional moment of inertia generated by the rotating mass in addition to the main absorber mass and its damping, which contributes to the damping and its variable fine adjustment. The drive wheel (7.1) and the rotating flywheel mass (6) can also be connected to one another via a gear which increases the rotational speed of the rotating mass, so that only a lower mass moment of inertia is required for frequency adaptation.

In addition to the at least one drive wheel (7.1) mentioned in one embodiment of the invention, the belt drive device (7) substantially comprises a running belt (7.2) made of materials customary for this purpose, a belt attachment preferably having a tensioning device for tensioning the belt, and a belt support sheet (7.3) having the same or approximately the same curvature, which is concentric to the curvature of the running device (1), so that the belt support sheet preferably lies directly on the curved surface of the running device and is fastened thereto or is an integral part of the running device.

In a simplified embodiment of the invention, the belt support sheet can be dispensed with if, due to the design and shape of the running device (1) and arrangement of the belt drive device (7), the running belt (7.2) can lay directly on the underside of the running device.

In a further embodiment of the invention, the belt drive device (7) has a deflection unit (7.4) for the drive belt (7.2), which as a rule comprises two or more deflection rollers (7.4.1) which run around shafts which are attached to the running gear. The deflection unit should ensure that the running belt (7.2) is guided over most of the path along the curved belt support sheet (7.3) with the exception of the immediate area to the left and right of the drive wheel (7.1).

The deflection unit (7.4) can also have a device for tensioning the running belt (7.2), with which the belt can be pretensioned and retensioned.

Figure 4A:
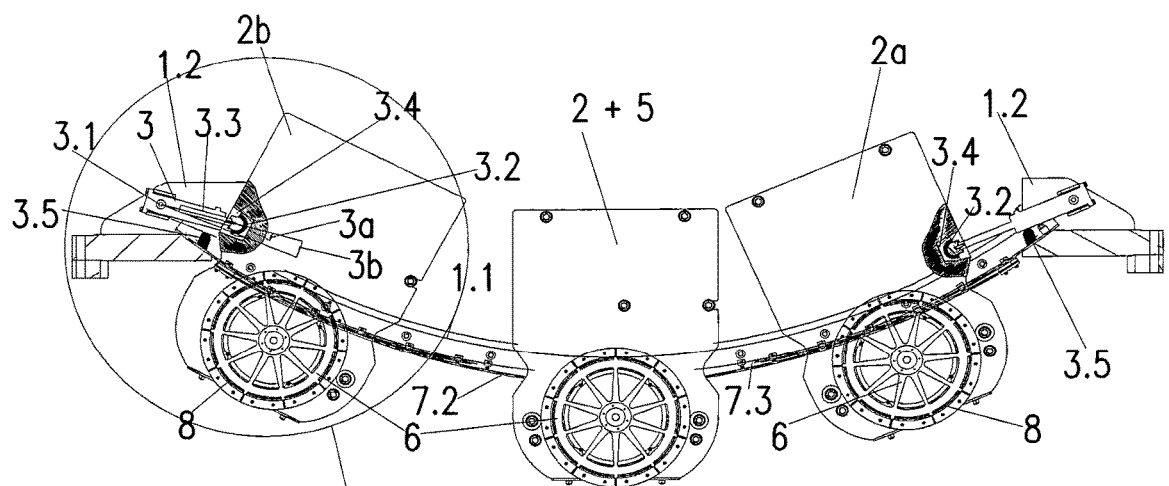
FIGS. 4A and 4B show a view of the rotating vibration absorber according to the invention according to FIG. 2, three possible positions of the running gear or the absorber masses being shown: the passage through the apex of the curved running trajectory (1.1) and the positions at the two end stops (1.2) at both ends of the running device (1).
Figure 4B:
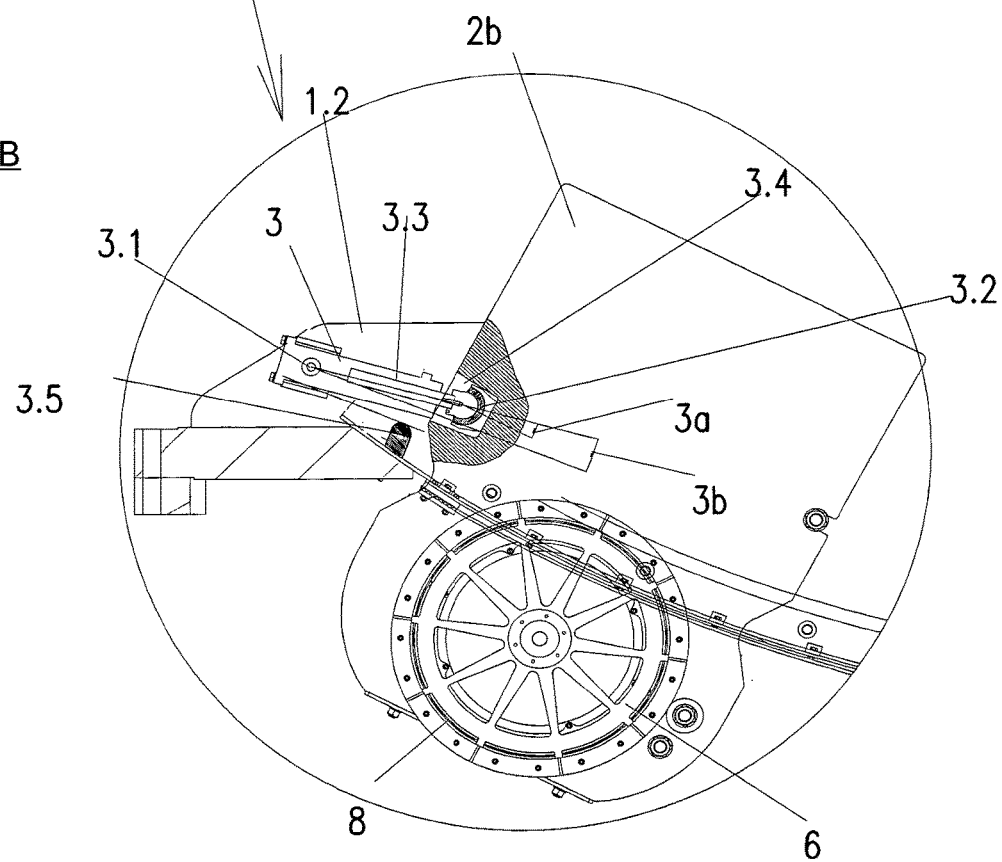

The running device (1) according to the invention substantially corresponds to the device disclosed in WO 2017/036581, but additionally has special end stops (1.2), which are explained in more detail in FIG. 4.

The running device preferably has two parallel running rails (1.1) and the running gear (2) is equipped with one, two, three, four, or more running wheels (2.1) on both rails, which guide and unload the running gear having the main absorber mass (5) and rotating flywheel mass (6). The running rails can also be replaced by running tubes.

In another embodiment of the invention (FIG. 4) the running gear has on both sides in the height and direction of the end stops, preferably conical recesses (3.4) into which the respective end stop (1.2) can be immersed. In an embodiment according to the invention, these recesses are lined with elastic material, so that the correspondingly shaped cone of the end stop, which can also be elastic, is cushioned.

In a further embodiment of the end stops (1.2), these represent hydraulic brake cylinders (3) having brake pistons (3.3) and brake cylinder cones (3.2), the latter dipping into the correspondingly shaped recess in the running gear.

Because of the curved trajectory, it is expedient or also necessary to make the end stops articulated so that the running gear can be optimally braked and guided. In addition to a joint for the brake piston (3.3), a joint for the brake cylinder cone (3.2) can also be provided, so that different angles (3a) (3b) can be operated and set.

In a special embodiment of the invention, the rotating vibration damper according to the invention has an additional damping device, which can preferably be installed in the flywheel of the rotating flywheel mass or represents a further functional part of the flywheel mass itself.

An eddy-current damping unit device (8), as has already been disclosed and described in detail in WO 2017/036581, has proven to be particularly advantageous and simple. Either the flywheel of the rotating flywheel mass is equipped with permanent magnets, for example on the outside diameter, and at the same time an electrical conductor disc, for example made of aluminum or copper, is attached to a non-rotating steel plate, which is part of the vibrating mass, for example. Conversely, it is also possible to manufacture the rotating flywheel itself from aluminum or copper or corresponding alloys and to attach the magnets to the outside diameter or circularly in the circumference of a permanently mounted non-rotating plate, which is attached, for example, between the flywheel and the rotating mass. By sliding the magnets over the aluminum plate or vice versa, a section modulus is achieved, which leads to temperature-independent damping. For fine tuning, an adjusting device can be provided on the drive shaft, with which the flywheel can be axially displaced and thus the air gap can be changed for precise damping adjustment.

Another possibility to realize the damping are magnets on the flywheel, which run in front of a stationary aluminum plate that widens towards the end and is attached to the running device. With the increasing width of the aluminum plate, the area covered by the magnets increases, which increases the damping. This causes a progressive damping towards the end of the oscillation path.

1 running device
   1.1 running rail
   1.2 stops on both sides of the running rail
2 running gear
   2.1 roller running gear
   2a running gear before the stop
   2b running gear fully deflected at the stop
3 brake cylinder on stops 1.2
   3.1 joint brake cylinder
   3.2 brake cylinder cone
   3.3 brake pistons
   3a setting angle brake cylinder cone
   3b setting angle brake cylinder
   3.4 cone immersion recess for brake cylinder in running gear 2
5 main absorber mass (on running gear 2)
6 rotating flywheel mass
7 belt drive device
   7.1 drive wheel/-roller for rotating flywheel mass 6
   7.2 running belt
   7.3 belt support sheet
   7.4 deflection unit
      7.4.1. deflection rollers/deflection wheels
8 eddy-current damper
   8.1. magnet arrangement
   8.2. conductor arrangement
   8.3 air gap
   8.4 plate for magnet arrangement bracket

The invention claimed is:

1. A rotating vibration absorber, that is variably adaptable to an interference frequency, which can be used in wind turbines, buildings, machines in systems having comparable vibration characteristics, the vibration absorber comprising:
   a running gear (2) equipped with running rollers (2.1), a main absorber mass (5), and a running device (1), wherein:
     the main absorber mass (5) is attached to the running gear or is an integral part of the running gear,
     the running device (1) for the running gear (2) is substantially circular or concave in such a way that the running gear or the main absorber mass (5) is movable and displayable on this running device from a central position or apex position in accordance with the vibrational forces which trigger movements acting in a direction of the running device,
     the running gear (2) or the main absorber mass (5) has at least one disc-shaped, rotationally symmetrical driven rotating flywheel mass (6) which has an axis of rotation perpendicular to the plane of the circular path of the running device, and moves together with the main absorber mass (5),
     the at least one disc-shaped rotating flywheel mass (6) comprises at least one rotating mass disc and has a direction of rotation which substantially corresponds to a respective direction of the moving running gear along the running device, and
   the disc-shaped rotating flywheel mass (6) is driven by a belt drive device (7) without effective involvement of the running rollers (2.1) of the running gear (2), the belt drive device is attached underneath the running device (1), and a center of gravity of the rotating flywheel mass (6), which is connected to the belt drive device, is below the running device (1).

2. The rotating vibration absorber according to claim 1, wherein the belt drive device (7) comprises a tensioned running belt (7.2), at least one drive wheel (7.1) and a belt support (7.3) which runs substantially concentrically to the curvature of the running device (1) and is attached underneath the running device (1) over its entire length, the rotating flywheel mass (6) is driven by the at least one drive wheel (7.1) which moves back and forth together with the disc-shaped rotating flywheel mass (6) on the running belt (7.2) below the belt support (7.3) in accordance with the movement of the running gear (2) on the running device (1), which movement is accomplished by the running rollers (2.1).

3. The rotating vibration absorber according to claim 2, wherein the running belt (7.2), during an operating state, is guided so that the running belt (7.2) substantially follows the curved shape of the belt support (7.3) in front of and behind the at least one drive wheel (7.1) and abuts the belt support and is attached thereto at its ends with an exception of an area of the at least one drive wheel (7.1).

4. The rotating vibration absorber according to claim 2, wherein the belt support (7.3) is attached to the running device or is an integral part of the same.

5. The rotating vibration absorber according to claim 2, wherein the running belt (7.2) is guided over a deflection unit (7.4) on both sides of the at least one drive wheel (7.1).

6. The rotating vibration absorber according to claim 4, wherein the deflection unit (7.4) is tensionable.

7. The rotating vibration absorber according to claim 5, wherein the deflection unit (7.4) comprises at least two deflection rollers (7.4.1) and a holder.

8. The rotating vibration absorber according to claim 1, wherein the running device (1) comprises at least one curved running rail (1.1) on which the running rollers (2.1) of the running gear (2) move in accordance with the acting vibration forces, and the at least one running rail (1.1) has a stop device (1.2), at opposed ends thereof, which interacts with a bearing (3.4) attached to or in the running gear (2) as soon as the running device (1) is adjacent a stop area of the stop device.

9. The rotating vibration absorber according to claim 8, wherein the stop device (1.2) comprises a hydraulic brake cylinder (3) which has an elastic brake cone (3.2) which precisely engages the bearing (3.4) in the running gear as soon as the running gear reaches the stop area.

10. The rotating vibration absorber according to claim 9, wherein the stop device has at least one joint (3.1) so that the brake cylinder can follow a change in angle (3a, 3b) of the running gear when moving on the curved trajectory.

11. The rotating vibration absorber according to claim 1, having an additional device for damping vibrations.

12. The rotating vibration absorber according to claim 11, wherein the additional device is an eddy-current damper (8) which is housed and effective in the component of the disc-shaped rotating flywheel mass (6).

13. The rotating vibration absorber according to claim 12, wherein the eddy-current damper (8) comprises a magnet arrangement (8.1) of permanent magnets and an electrical conductor disc (8.2), the electrical conductor disc and magnet arrangement are arranged opposite and are separated from one another by an air gap (8.3) and thus arranged and fastened such that the conductor disc and magnet arrangement can be moved relative to each other by rotating the disc-shaped rotating flywheel mass (6).

14. The rotating vibration absorber according to claim 13, wherein one of:
   (a) the magnet arrangement (8.1) is arranged on a circumference of the disc-shaped rotating flywheel mass (6) thus co-rotating therewith, and the electrical conductor disc (8.2) is attached between the magnet arrangement (8.1) and the disc-shaped rotating flywheel mass (6), or
   (b) the electrical conductor disc (8.2) is arranged on the circumference of the disc-shaped rotating flywheel mass (6) thus co-rotating therewith, or is itself the conductor disc, and the magnet arrangement (8.1) is arranged on a plate (8.4) which does not co-rotate with the disc-shaped rotating flywheel mass and is located between the electrical conductor disc and the disc-shaped rotating flywheel mass (6).

15. The rotating vibration absorber according to claim 2, wherein the running belt (7.2) is guided over a deflection unit (7.4) on both sides of the at least one drive wheel (7.1) and has a tensioning device.

16. A wind power plant comprising at least one rotating vibration absorber according to claim 1.

* * * * *